United States Patent [19]
Rogers

[11] 3,921,869
[45] Nov. 25, 1975

[54] BICYCLE CARRYING RACK

[76] Inventor: Winston L. Rogers, P.O. Box 206, Rheem Valley, Calif. 94570

[22] Filed: May 6, 1974

[21] Appl. No.: 467,104

[52] U.S. Cl. ............................................ 224/42.03 B
[51] Int. Cl.² ................................................ B60R 9/10
[58] Field of Search ............... 224/42.03 B, 42.03 A,
42.03 R, 224/29 R, 42.06, 42.07, 42.08,
42.42 R, 42.43, 43.45 R, 42.46 R; 211/17,
18, 19, 20, 21, 22

[56] References Cited
UNITED STATES PATENTS

| | | | |
|---|---|---|---|
| 3,710,999 | 1/1973 | Allen | 224/42.03 B |
| 3,752,375 | 8/1973 | Weigl | 224/42.03 B |

FOREIGN PATENTS OR APPLICATIONS

| | | | |
|---|---|---|---|
| 864,799 | 5/1941 | France | 224/42.03 B |

OTHER PUBLICATIONS

All American Products, Inc., 2200 W. Diversey Chicago, Ill., Lug-a-Bike, Aug. 15, 1972.

Primary Examiner—Robert J. Spar
Assistant Examiner—Jerold M. Forsberg
Attorney, Agent, or Firm—Bruce & McCoy

[57] ABSTRACT

A bicycle carrying rack for mounting on an automobile comprised of an inverted U-shaped carrying frame having a multiplicity of offset bicycle handle engaging bracket pairs attached thereto, a bicycle seat support bar and an adjustable mounting frame whereby adjacent bicycle handle bars can be laterally nested such that bicycles can be closely arranged to project perpendicularly from the carrying frame.

7 Claims, 9 Drawing Figures

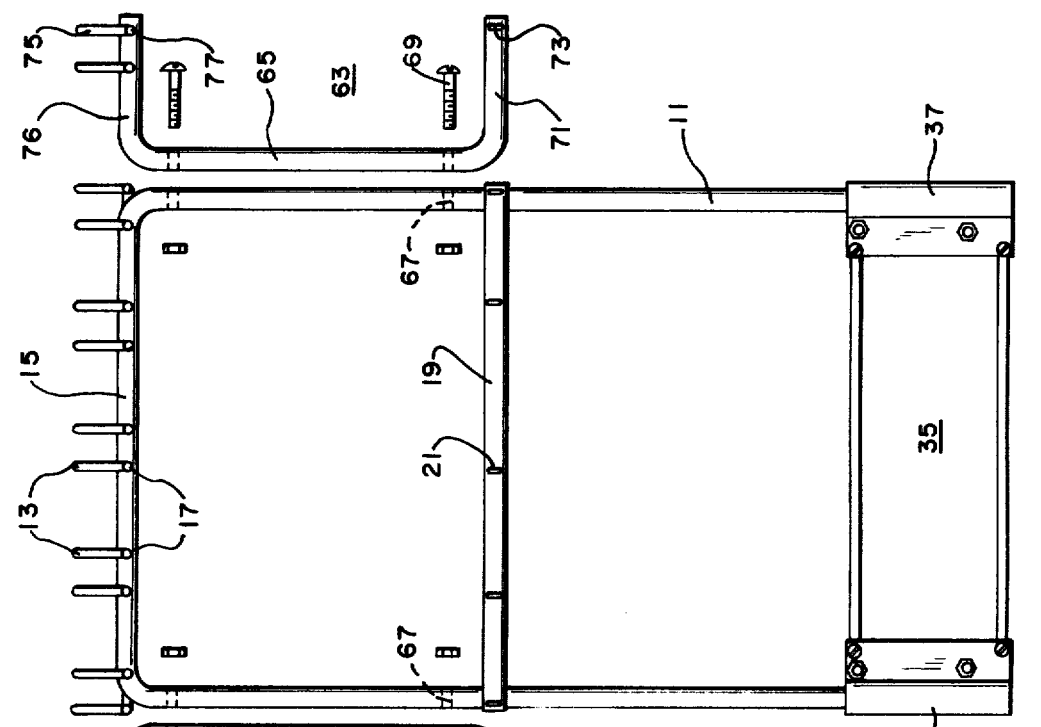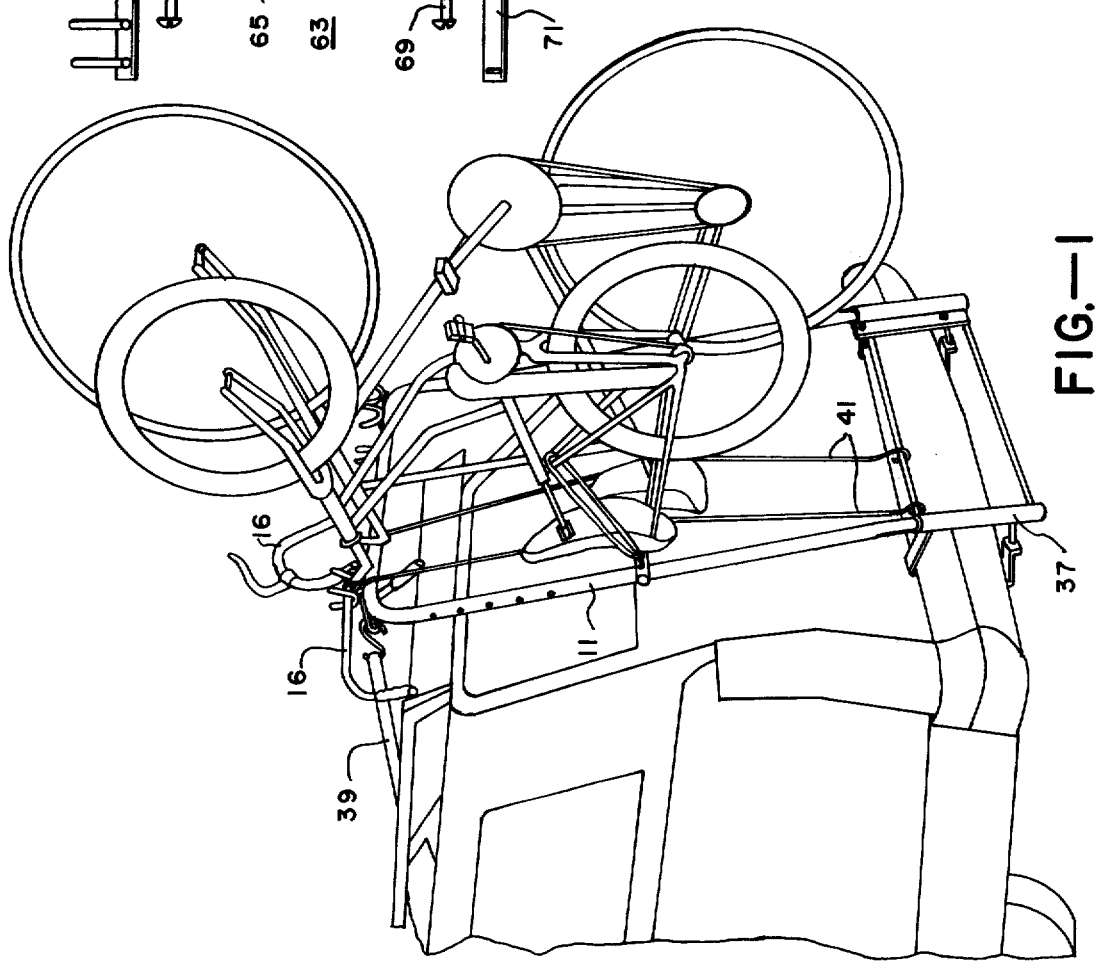

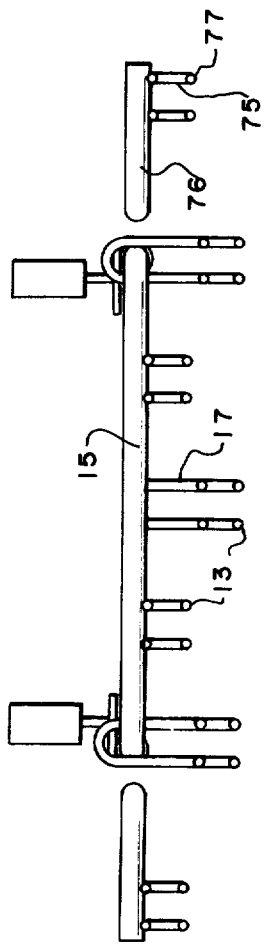
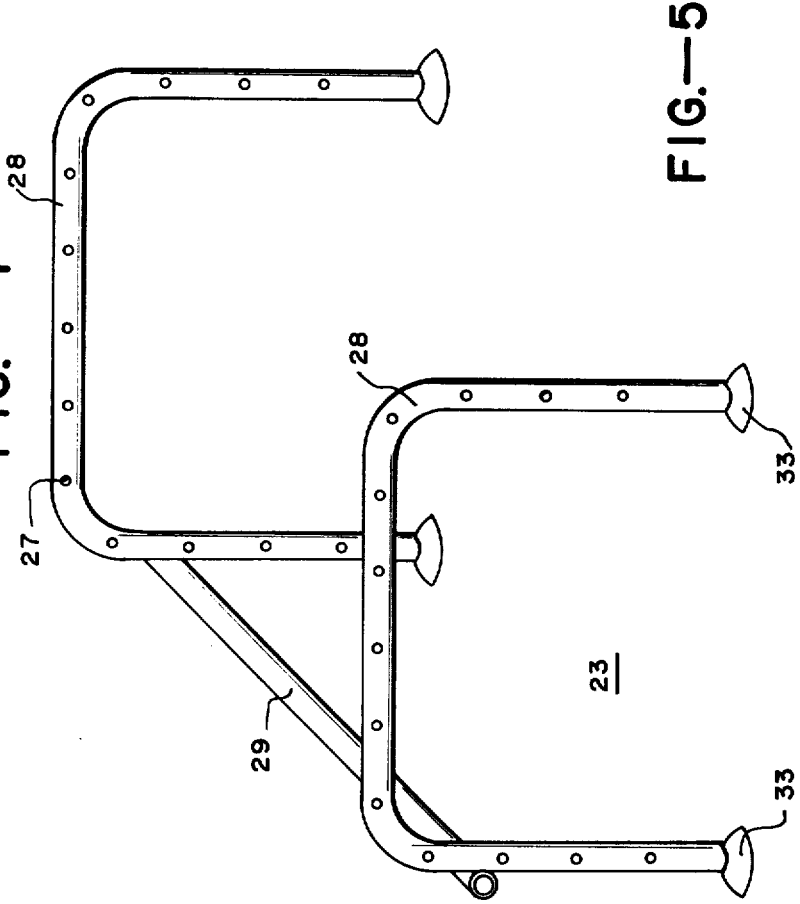
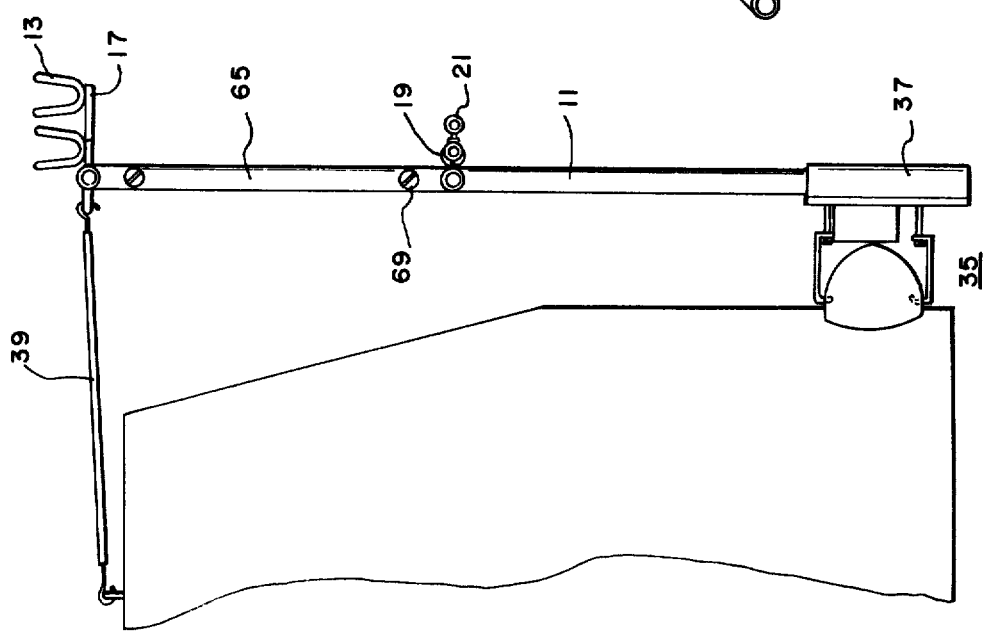
FIG.—4
FIG.—5
FIG.—3

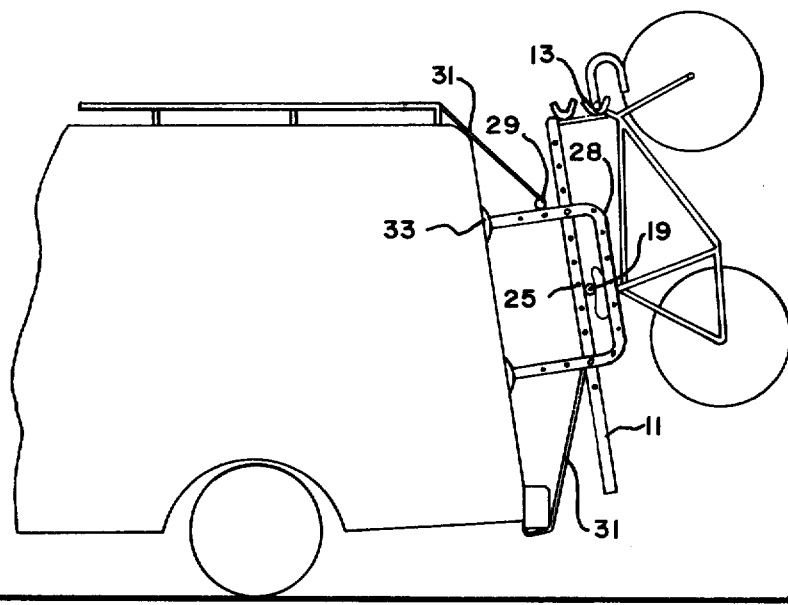
FIG.—6
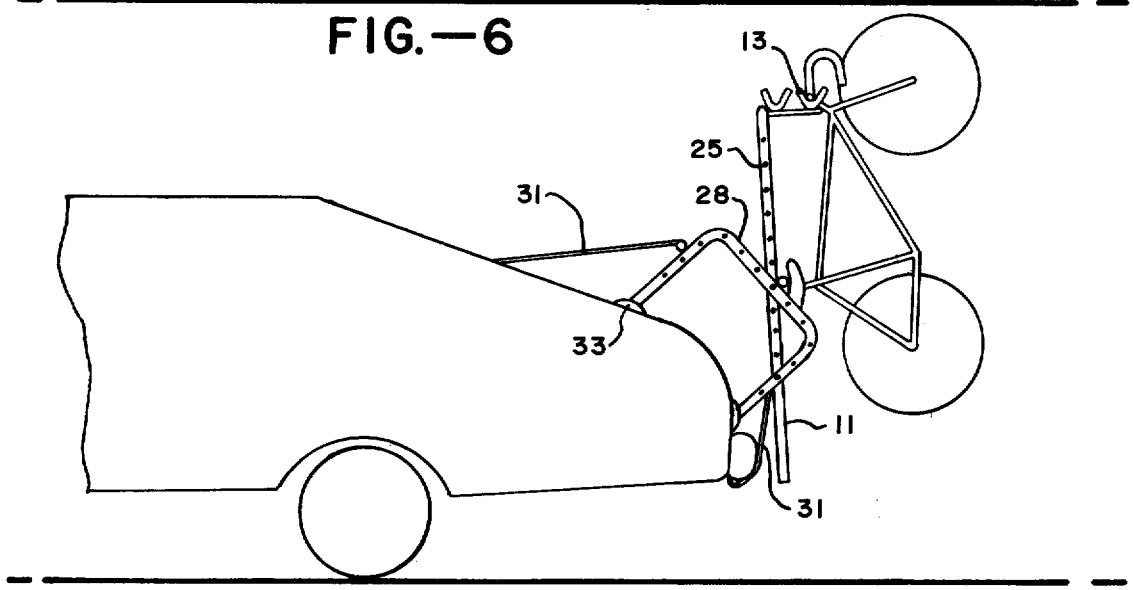
FIG.—7

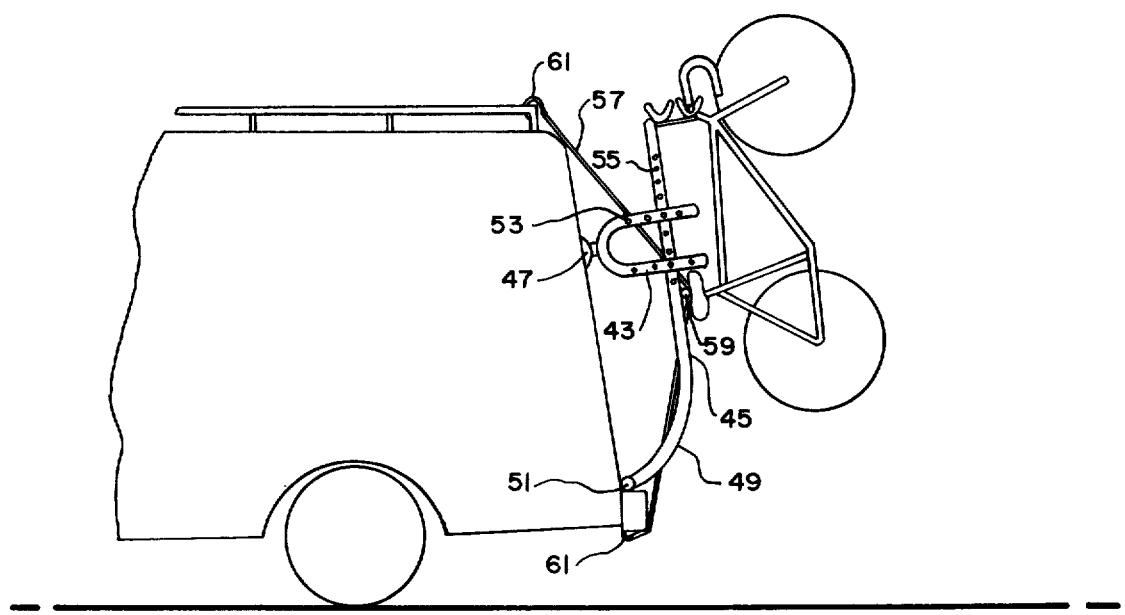
FIG.—8
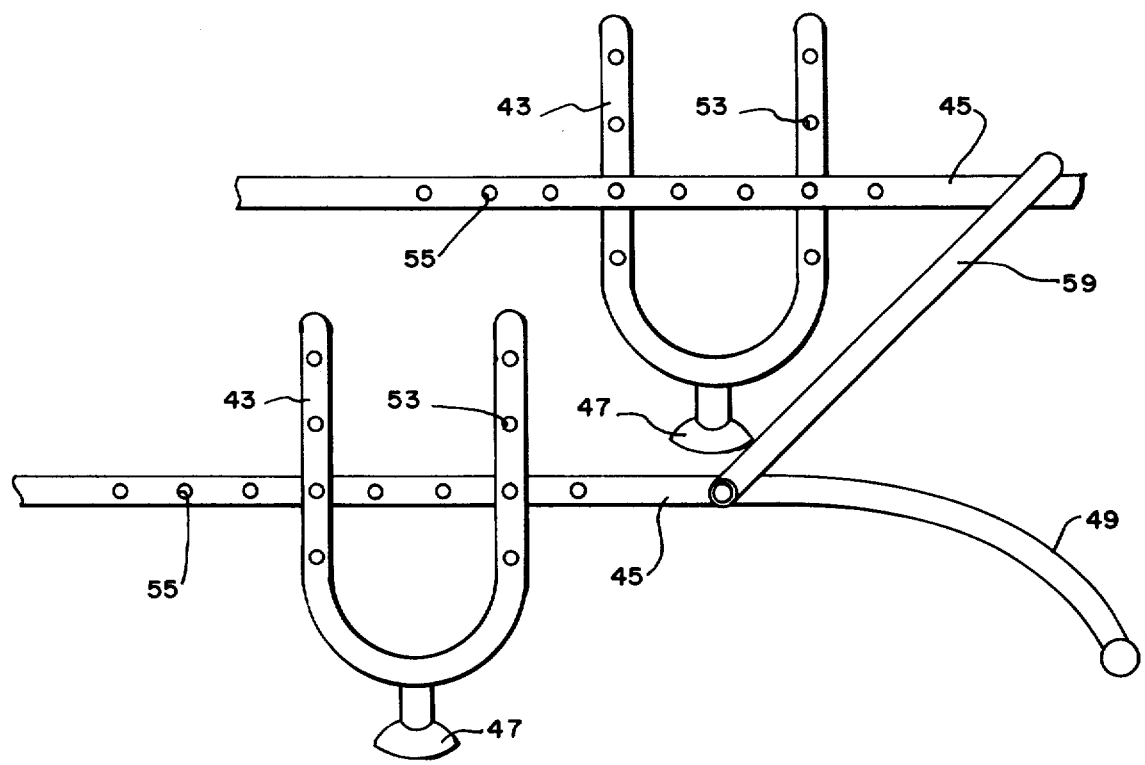
FIG.—9

BICYCLE CARRYING RACK

BACKGROUND OF THE INVENTION

1. FIELD OF INVENTION

The present invention relates to a means for transporting bicycles and more particularly to a bicycle carrying rack for mounting on an automobile.

2. DESCRIPTION OF THE PRIOR ART

A legion of racks have been developed for carrying bicycles on different vehicles, principally automobiles. These racks variously engage the bicycles horizontally to the vehicles as is shown in Douglas, U.S. Pat. No. 586,681, or vertically to the vehicles as is shown in Martin, French Pat. No. 864,799. A problem arises, however, when it is desired to carry more than two or three bicycles on a single rack such as would be mounted on the rear of an automobile. In the case of vertically held bicycles, the interference between the handle bars of adjacent bicycles requires that the bicycles be spaced apart thereby limiting the available space in which to arrange the bicycles lest they extend substantially beyond the sides of the car.

The present invention overcomes this limitation by providing a bicycle carrying rack which has offset bicycle handle engaging brackets for carrying bicycles in an offset relation with respect to one another such that the handle bars of a bicycle carried on the rack to not interfere with the handle bars of adjacent bicycles. In this manner, bicycles can be closely nested on the carrying rack thereby providing the increased capability of transporting a number of bicycles on a single automobile.

The bicycle rack disclosed in the Martin patent, cited above, provides two pair of brackets for cradling the handle bars of up to two bicycles disposed to project vertically from the rear of the automobile. However, because of the lateral alignment of the handle bars the bicycles held on the Martin rack must be spaced apart, and the rack cannot carry more than two or three bicycles. The present invention can be distinguished from the Martin rack in that it provides offset bicycle handle bar engaging brackets whereby bicycles vertically projecting from the automobile can be closely arranged by laterally nesting the handle bars of adjacent bicycles. The carrying capacity of the bicycle rack of the present invention is thereby increased over the Martin rack.

Other prior art bicycle racks are disclosed in the Feb., 1973, edition of BICYCLING, pp. 20–23, a magazine published be Leete Publications. Most of the racks described therein are of the construction which carries bicycles horizontally with respect to the automobile. Such racks are self limiting since it is difficult to carry more than a couple of bicycles in this manner. However, two of the racks described therein are of the type which holds the bicycles vertically with respect to the automobile. One, manufactured by JCI Cycles Caddies, is a roof rack comprised of two parallel bars to which the bicycles carried on the rack are secured. Adjacent bicycles are turned 180° from one another such that the handle bars of one bicycle abuts the seats of adjacent bicycles. The disadvantage of this rack is that, first, nesting of the bicycles is limited because the handle bars of each bicycle abut the seats of adjacent bicycles, and secondly, it is more difficult to maneuver the bicycles to the top of the automobile and then tie them down to the rack.

Another rack, called the E-Z Rack, manufactured by Racks Unlimited, also holds bicycles vertically with respect to the automobile but in an upright rather than inverted position. Channel members are provided to engage the bicycle tires with the bicycles being held upright by a vertically projecting frame. A degree of nesting can be accomplished with this configuration so long as adjacent bicycles are of different sizes; however, if bicycles of the same size and style are carried on the E-Z rack the same above-mentioned problem orrurs in that the handle bars, being at the same level, will laterally abut one another thereby limiting the carrying capacity of the rack.

Another problem with existing carrying racks is that individual racks are designed for certain shapes and configurations of automobiles, for example, a vertical back stationwagon, a slant back, or a square back. The present invention overcomes this problem by providing an adjustable bicycle carrying rack which is easily mountable to an automobile of any shape or configuration and, regardless of the shape of the automobile, always carries the bicycles held thereon in vertical outwardly projecting position.

The present invention provides a novel bicycle rack which can be easily mounted on and adjusted for almost any shape of automobile. In addition, offset bicycle handle bar engaging brackets are provided whereby the bicycles carried on the rack can be laterally nested to provide additional space for carrying extra bicycles.

SUMMARY OF THE INVENTION

The present invention is a bicycle carrying rack for mounting on an automobile. It is comprised of an inverted U-shaped carrying frame having a multiplicity of offset bicycles handle engaging bracket pairs secured to the horizontal support bar member thereof whereby the handle bars of adjacent bicycles may be laterally nested in close arrangement. Also provided is a means for fixably supporting the bicycle seats relative to the carrying frame whereby the bicycles are held to project perpendicularly outward from the automobile in a closely parallel relationship. The invention further includes a means for mounting the carrying frame to the rear portion of the automobile in an approximately vertical upright position.

OBJECTS OF THE INVENTION

It is therefore an important object of the present invention to provide a bicycle carrying rack for transporting bicycles which can be easily mounted onto the rear portion of an automobile.

It is another object of the present invention to provide a bicycle carrying rack which is adjustable such that it can be adapted to variously shaped automobiles such as a vertical back stationwagon, a slant back, or a square back.

It is a further object of the present invention to provide a bicycle carrying rack having offset bicycle handle engaging brackets whereby adjacent handle bars on adjacent bicycles can be laterally nested in a closely spaced arrangement without physical contact between the bicycles thereby preventing scratching and damage to the bicycles.

It is still another object of the present invention to provide a bicycle carrying rack which carries a multiplicity of bicycles which project perpendicularly outward from the automobile in a closely spaced parallel relation.

It is still a further object of the present invention to provide a bicycle carrying rack having attachable auxiliary racks for extending the capacity of the carrying rack when desired.

Other objects of the present invention will become apparent when the invention is considered in its preferred forms as is disclosed in the accompanying specification and drawings.

DESCRIPTION OF THE DRAWING

FIG. 1 is a perspective view of one embodiment of the present invention showing two bicycles carried on a frame mounted to the rear of a stationwagon;

FIG. 2 is a front elevational view of the bicycle carrying rack shown in FIG. 1 further showing auxilary racks attached thereto;

FIG. 3 is a side elevational view of the bicycle carrying rack shown in FIG. 2;

FIG. 4 is a top plan view of the bicycle rack shown in FIG. 3;

FIG. 5 is a perspective view of a mounting frame for adjustably mounting the bicycle rack to an automobile;

FIG. 6 is a perspective view of the bicycle carrying rack mounted on a vertical back stationwagon uning the mounting frame of FIG. 5;

FIG. 7 is a perspective view of the bicycle carrying rack mounted on a slant back automobile using the mounting frame of FIG. 5; and FIG. 8 is a perspective view of the present invention showing a third alternative embodiment for mounting the bicycle carrying rack on an automobile.

FIG. 9 is a partial perspective view of the bicycle carrying rack shown in FIG. 8.

DESCRIPTION OF THE PREFERRED EMBODIMENT

The description set forth herein is to be details of the invention in its preferred form. The present invention is a bicycle carrying rack for mounting on the rear portion of an automobile. Referring to the drawings, and particularly at this point to FIGS. 1-7, the invention comprises a carrying frame 11 which is shaped in the form of an inverted U. A multiplicity of bicycle handle engaging bracket pairs 13 are secured to the horizontal support bar member 15 of the carrying frame with each bracket pair being disposed in an offset relation with respect to adjacent bracket pairs. Because of this offset relation, adjacent handle bars of adjacent bicycles may be laterally nested in a close arrangement rather than being spaced apart due to the abuttment of the handle bars that would occur if no offset relationship existed.

Each bracket of the bracket pairs 13 are preferably U-shaped such that they can cradle bicycle handle bars 16 and are interconnected to the horizontal support bar member of the carrying frame by extension bar members 17 which have alternatingly different lengths to effect the above-described offset relationship of the bicycle handle engaging bracket pairs. The bracket pairs thus extend perpendicularly from the inverted U-shaped carrying frame whereby one bicycle is held close to the plane of the carrying frame, the next adjacent bicycle is held slightly away from that frame such that the handle bars carried on each do no interfere, and the next adjacent bicycle is held in the same manner as the first bicycle, and so on. Although the preferred embodiment calls for a perpendicular offset arrangement, the offset relation could alternatively be effected by vertically disposing the above-described bracket pairs one above the other, such that bicycles carried on the lower disposed bracket pairs could laterally nest their handle bars with adjacent bicycles which are carried in a slightly elevated position.

A means for supporting the seats of the bicycles carried on the rack of the present invention is provided in the form of an intermediate cross bar member 19 which is horizontally disposed between the leg portions of the inverted U-shaped carrying frame. This cross bar member is spaced to a position where the seats of the bicycles can rest thereon when the handle bars of the bicycles are cradled in bicycle handle engaging bracket pairs 13. This bar, like the inverted U-shaped carrying frame, can be simply fabricated from metal tubing.

As is shown in FIG. 1 of the drawings, bicycles carried on the rack of the present invention are supported by bracket pairs 13 together with cross bar member 19 such that they project perpendicularly outward from the automobile or the plane of the carrying frame in a closely spaced parallel relationship. This relationship, of course, is made possible by the above-described nesting of the adjacent handle bars of adjacent bicycles.

A means is provided for securing the bicycle seats to the cross bar member 19. In its preferred form, this means includes eye hooks 21 suitably spaced on the cross bar member, together with straps, or the like, which are not shown.

A means for releasably mounting the inverted U-shaped carrying frame 11 to the rear portion of an automobile in an approximately vertical upright position is also provided. Three embodiments of this mounting means are described herein, and are shown respectively in FIGS. 1-4, FIGS. 5-7, and FIGS. 8-9. Since it is deemed to be the most versatile mounting means, the embodiment shown in FIGS. 5-7 is first described.

The attachment means shown in FIGS. 5-7 includes mounting frame 23 which is fixably adaptable to the rear portion of automobiles having different inclinations and shapes which inclinations and shapes can vary widely with the style of the automobile. A means for adjustably engaging the leg portions of the inverted U-shaped carrying frame can be secured to the mounting frame at any one of a number of preselected attitudes with respect to each other. The relative attitude which is selected will depend on the inclination of the rear surface of the automobile to which the mounting frame is attached such that the carrying frame will always be held in an approximately vertical upright position. For example, the carrying frame can be adjusted on the mounting frame such that it can be vertically carried on the rear of a stationwagon as shown in FIG. 6 of the drawings, or it can be adjusted further back on the mounting frame such that it can be vertically carried on a mounting frame attached to a slant back automobile such as is shown in FIG. 7 of the drawings. By utilizing mounting frame 23 the bicycle rack of the present invention can be adapted to almost any rear end configuration of an automobile In order to adjustably engage the carrying frame to the mounting frame, there is provided a series of holes 25 formed in each leg of the carrying frame, and also a corresponding series of holes 27 formed in the mounting frame itself. Each series of holes has a pre-selected position such that, by lining up suitable hole pairs in the carrying frame and mounting frame and inserting a fastening means therethrough, the carrying frame can be secured to the mounting frame at different angles or attitudes with respect thereto.

In the preferred embodiment, the mounting frame is comprised of two side bar members 28 which are formed in the shape of an inverted U and which are held in spaced relation by cross tie member 29. As can be seen in FIGS. 6 and 7, holes 25 formed in the carrying frame legs can be selectively matched with holes formed in both the horizontal portion and one leg member of the inverted U-shaped side bar members of the mounting frame such that different angulations can be achieved between the mounting frame and the carrying frame depending on which holes are selected. Though side bar members 28 are preferably in the shape of an inverted U, other shapes can be used as well. It should also be pointed out that although cross tie member 29 is provided to give a unitary construction to the mounting frame, it may be omitted whereby the side bar members are simply engaged with the carrying frame before the combination is mounted to the automobile.

This first embodiment of the mounting frame further includes adjustable straps 31 which are secured between the mounting frame and a rain gutter or trunk lid or the like and the bumper. Hooks are preferably attached to the free ends of the straps for so engaging the automobile. Suction cups 33 are also preferably secured to the ends of the outwardly projecting legs of the mounting frame to both provide a non-sliding engagement between the mounting frame and the automobile surface and to prevent any damage to such surface.

The second embodiment of the means for attaching the carrying frame to the automobile is shown in FIGS. 1-4 and includes a base frame 35 which is attachable to the automobile bumper. The base frame has two oppositely disposed vertical sockets 37 suitably spaced for capturing the ends of the legs of the inverted U-shaped carrying frame when such legs are disposed therein. The carrying frame is held in a substantially vertical position and is easily removed by simply lifting the frame from the sockets. Thus, although this embodiment is not as adaptable to the various shaped automobiles as is the first embodiment described above, by permanently leaving the relatively unobtrusive base frame 35 fixed to the bumber of the automobile the carrying frame can be easily engaged and disengaged from the automobile.

A means for stabilizing the upper portion of the carrying frame with respect to an automobile is provided to prevent the frame from vibrating or swaying in the base frame 35 while the automobile is in motion. This means preferably takes the form of cords 39 one end of which is secured to the upper portion of the carrying frame and the other end of which is secured to any suitable engageable portion on the automobile, such as a gutter or trunk lid. For further stability, stretch cords 41, which are shown in FIG. 1 of the drawings, can be secured between the handle bars or frames of the bicycles carried on the carrying rack and the base frame.

A third embodiment of the present invention is shown in FIGS. 8 and 9 of the drawings. This embodiment includes a pair of U-shaped mounting brackets 43 for engaging the U-shaped carrying frame 45 for fixably holding the carrying frame at a fixed distance from the automobile surface. Each of the mounting brackets 43 have a resilient automobile surface engaging member 47 secured to the base thereof. Preferably, this engaging member is in the form of a suction cup to inhibit any sliding of the mounting brackets with respect to the automobile surface.

To support the lower end of the U-shaped carrying frame, the ends 49 of the leg portions of the mounting frame are formed to curve inwardly toward the surface of the automobile for engagement therewith. It is preferable that a resilient soft stop 51 be secured to the end of this curved portion to prevent any damage to the automobile. Except for this curved end feature, the inverted U-shaped carrying frame of this embodiment is identical to the U-shaped carrying frames described in embodiments 1 and 2 above.

To engage the inverted U-shaped carrying frame, mounting brackets 43 have holes 53 formed along the leg portions thereof and similar holes 55 are formed along the sides of the legs of the carrying frame. The holes in the mounting brackets and carrying frame can be aligned and a fastening means inserted therethrough to hold the carrying frame on the mounting brackets. To secure the combination formed by carrying frame 45 and mounting brackets 43 to the automobile, adjustable straps 57 are provided which are secured between a protrusion, such as a gutter, on the upper portion of the automobile and the rear bumper thereof. These straps extend over intermediate cross bar member 59 disposed between the two legs of the inverted U-shaped carrying frame and co-act to hold the assembly of the carrying frame and mounting brackets against the surface of the automobile. Suitable hooks 61 are preferably secured to the ends of the straps for engaging the automobile.

Referring again to FIG. 2 of the drawings, auxiliary carrying racks 63 are provided which are attachable to either side of the inverted U-shaped carrying frame of any one of the above-described embodiments. These auxiliary racks extend laterally from the side of the carrying frame to provide extra bicycle handling capability when needed.

The auxiliary rack includes a C-shaped carrying frame 65 having at least two holes 67 formed in the vertical portion thereof such that the frame can be fastened, such as by bolts 69, to the legs of the inverted U-shaped carrying frame thereby extending the effective lateral dimensions thereof. The lower outward projecting leg 71 of the C-shaped frame 65 is formed to support the seats of bicycles carried on the auxiliary rack 63 and provided on this lower projecting leg is a means, such as eye hooks 73 and straps which are not shown, for securing the bicycle seats thereto. A pair of bicycle handle engaging brackets 75 are interconnected to the top outward projecting leg 76 of the C-shaped frame 65 by extension bar members 77 having a length such that the carrying brackets on the auxiliary rack are offset with respect to the immediately adjacent brackets on the inverted U-shaped carrying frame. An additional bicycle can thus be carried on each of the auxiliary racks and can be laterally nested with respect to the bicycles disposed on the inverted U-shaped carrying frame. Of course, if it is desired, the auxiliary rack can be designed to carry more than one additional bicycle by extending its length and by adding additional bicycle handle engaging brackets.

The present invention is a novel bicycle carrying rack which provides the capability of carrying a large number of bicycles on a single rack by securing bicycle handle engaging brackets to a carrying frame in an offset relationship such that the bicycle handle bars of adjacent bicycles can be laterally nested rather than being spaced apart in an abutting relation. This capacity for carrying a large number of bicycles is further extended by providing two auxiliary carrying racks which are attachable to the sides of the carrying frame of the main bicycle rack. The present invention further provides the advantage of having an embodiment which can adapt to variously shaped automobiles such that the carrying frame of the bicycle rack is always held in the same vertical position for carrying the bicycles. Thus, the present invention is not limited to one particular type and shape of automobile but is adaptable to many automobiles.

Although the present invention has been described in considerable detail in the above specifications and drawings, it is not intended that it be limited to such detail and description except as may be necessitated by the appended claims.

I claim:

1. A bicycle carrying rack for mounting on an automobile comprising an inverted U-shaped carrying frame the U-shaped frame having a horizontal bar portion;

a multiplicity of bicycle handle bar engaging bracket pairs, each pair for supporting a bicycle, secured to the horizontal bar portion of said carrying frame, each of said bracket pairs being offset in the direction of the longitudinal axis of the vehicle with respect to adjacent bracket pairs whereby the adjacent handle bars of adjacent bicycles may be laterally nested in a close arrangement rather than arranged apart in abutting relation, an intermediate cross bar member horizontally disposed between the leg portions of said inverted U-shaped carrying frame for supporting the seats of said bicycles and means securing the cross bar relative to said carrying frame whereby the bicycles carried on said carrying frame project perpendicularly outward from the automobile in a closely spaced parallel relationship, means for securing the bicycle seats to said cross bar member, means for mounting said carrying frame to the rear portion of said automobile in an approximately vertical upright position, said means for mounting said carrying frame to an automobile includes a mounting frame fixably adaptable to the rear portion of automobiles having different inclinations such as a vertical back, a slant back, or a horizontal back, said mounting frame having a means for adjustably engaging the leg portions of said inverted U-shaped carrying frame and securing the same to said mounting frame whereby the attitude of said carrying frame can be varied with respect to said mounting frame depending on the inclination of the rear surface of the automobile to which said mounting frame is attached, and wherein said bicycles are supported on the rack by their handle bars and seats with the longitudinal axis of the bicycle in a substantially vertical position.

2. The bicycle carrying rack of claim 1 wherein said carrying bracket pairs are U-shaped for cradling the handle bars of said bicycle and are interconnected to said horizontal support bar member by extension bar members having alternatingly different lengths to create the offset to said pairs.

3. The bicycle carrying rack of claim 1 wherein said means for adjustably engaging said carrying frame to said mounting frame includes a series of selectively positioned holes formed in each leg portion of said carrying frame and a similiar set of holes formed in said mounting frame such that said carrying frame can be secured to said mounting frame at a multiplicity of different attitudes with respect thereto by lining up corresponding holes in said carrying and mounting frames and inserting fastening means therethrough.

4. A bicycle carrying rack for mounting on an automobile comprising an inverted U-shaped carrying frame, a multiplicity of U-shaped bicycle handle engaging bracket pairs secured to said carrying frame by extension bar members having alternatingly different lengths, the brackets receiving and supporting a bicycle handle bar assembly, whereby each bracket pair is offset with respect to adjacent bracket pairs of said carrying frame so that adjacent handle bars of adjacent bicycles may be laterally nested in a close arrangement rather than arranged apart in abutting relation, an intermediate cross bar member horizontally disposed between the leg portions of said inverted U-shaped carrying frame for permitting the seats of the bicycles to be supported on said carrying frame whereby the bicycles project perpendicularly outward from the automobile in a closely spaced parallel relationship, means for releasably securing said bicycle seats to said cross bar, a mounting frame adaptable to the rear portion of variously shaped automobiles, said carrying frame and said mounting frame having a series of corresponding holes formed in the lateral sides thereof to permit said carrying frame to be secured to said mounting frame at a multiplicity of different attitudes with respect to said mounting frame by aligning preselected holes in said frames and inserting fastening means therethrough whereby said carrying frame can be secured to said mounting frame in an approximately vertical position regardless of the shape of the rear portion of the automobile, means for securing said U-shaped frame to said mounting frame, means for releasably securing said mounting frame in fixed relation to the automobile, whereby the attitude of said carrying frame can be varied with respect to said mounting frame depending on the inclination of the rear surface of the automobile to which said mounting frame is attached.

5. The bicycle carrying rack of claim 4 wherein said means for securing said mounting frame to an automobile includes adjustable straps secured at one end of said mounting frame and having hooks attached to the free ends thereof for fixably engaging said frame to the automobile, and resilient suction cups secured to the ends of said outwardly projecting legs of said mounting frame whereby said mounting frame can adapt in non-sliding relation to the body contour of the automobile.

6. The bicycle carrying rack of claim 4 wherein said mounting frame includes side bar members generally formed in the shape of an inverted U whereby said carrying frame can be secured to said mounting frame between said side bar members at different attitudes by aligning corresponding holes in said frames and inserting fastening means therethrough.

7. The bicycle carrying rack of claim 4 further including at least one auxiliary carrying rack attachable to either side of said inverted U-shaped carrying frame, to laterally extend therefrom, said auxiliary rack comprising a C-shaped carrying frame with a plurality of holes aligned along the vertical portion thereof whereby said frame can be bolted to the legs of said inverted U-shaped carrying frame, the lower outward projecting leg portion of said C-shaped frame being formed to support the seats of bicycles carried on said auxiliary carrying rack and having means for securing same thereto, and a pair of bicycle handle engaging brackets secured to the top outward projecting leg of said C-shaped frame by extension bars of a length such that said auxiliary rack brackets are offset with respect to the brackets secured to said inverted U-shaped carrying frame whereby additional bicycles carried by said auxiliary rack can be laterally nested with bicycles disposed on the inverted U-shaped carrying frame.

* * * * *